April 14, 1942. C. A. BREWER 2,279,732
POWER DEVICE
Filed Aug. 7, 1934 2 Sheets-Sheet 1
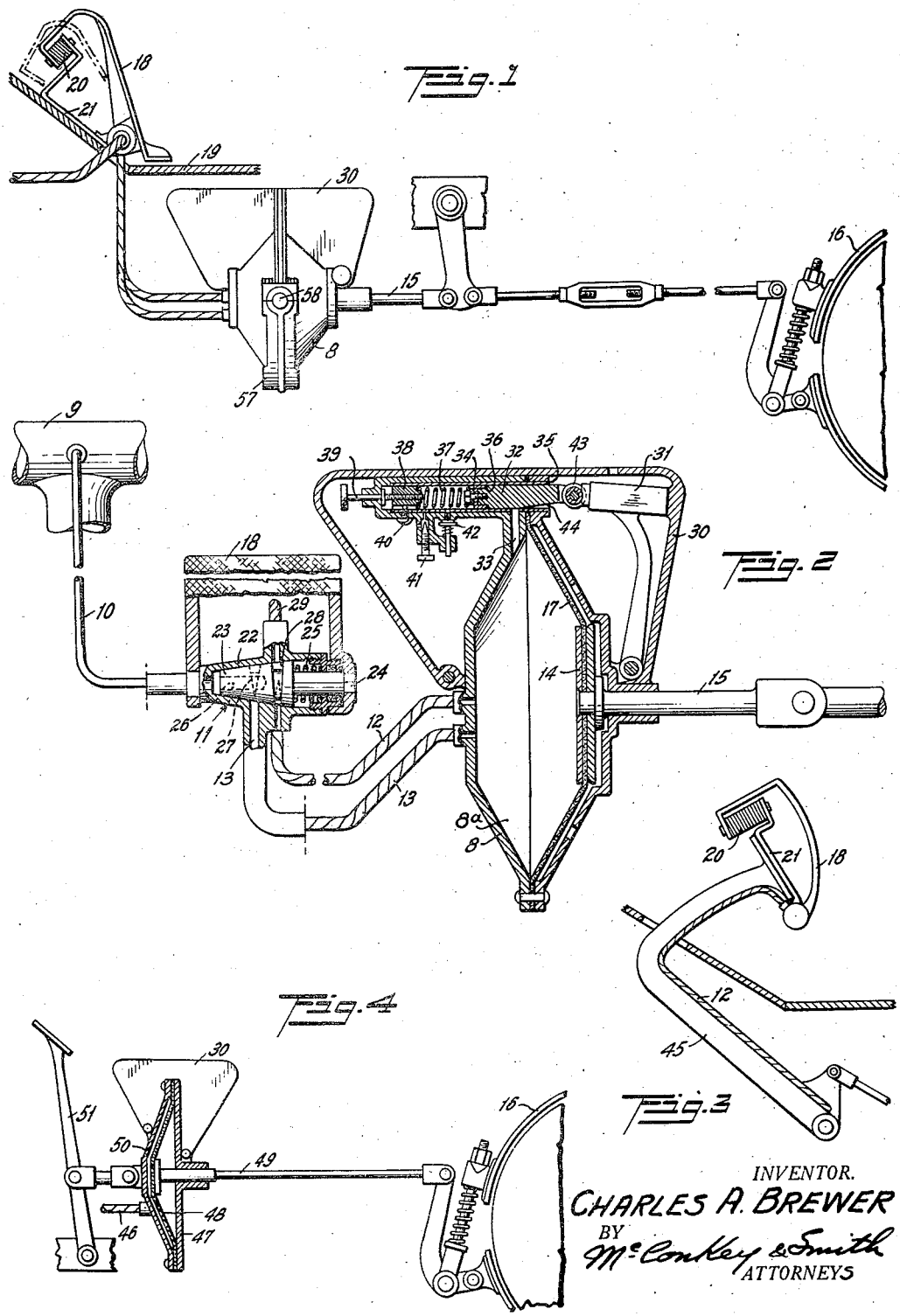
INVENTOR.
CHARLES A. BREWER
BY
McConkey & Smith
ATTORNEYS April 14, 1942.   C. A. BREWER   2,279,732
POWER DEVICE
Filed Aug. 7, 1934   2 Sheets-Sheet 2
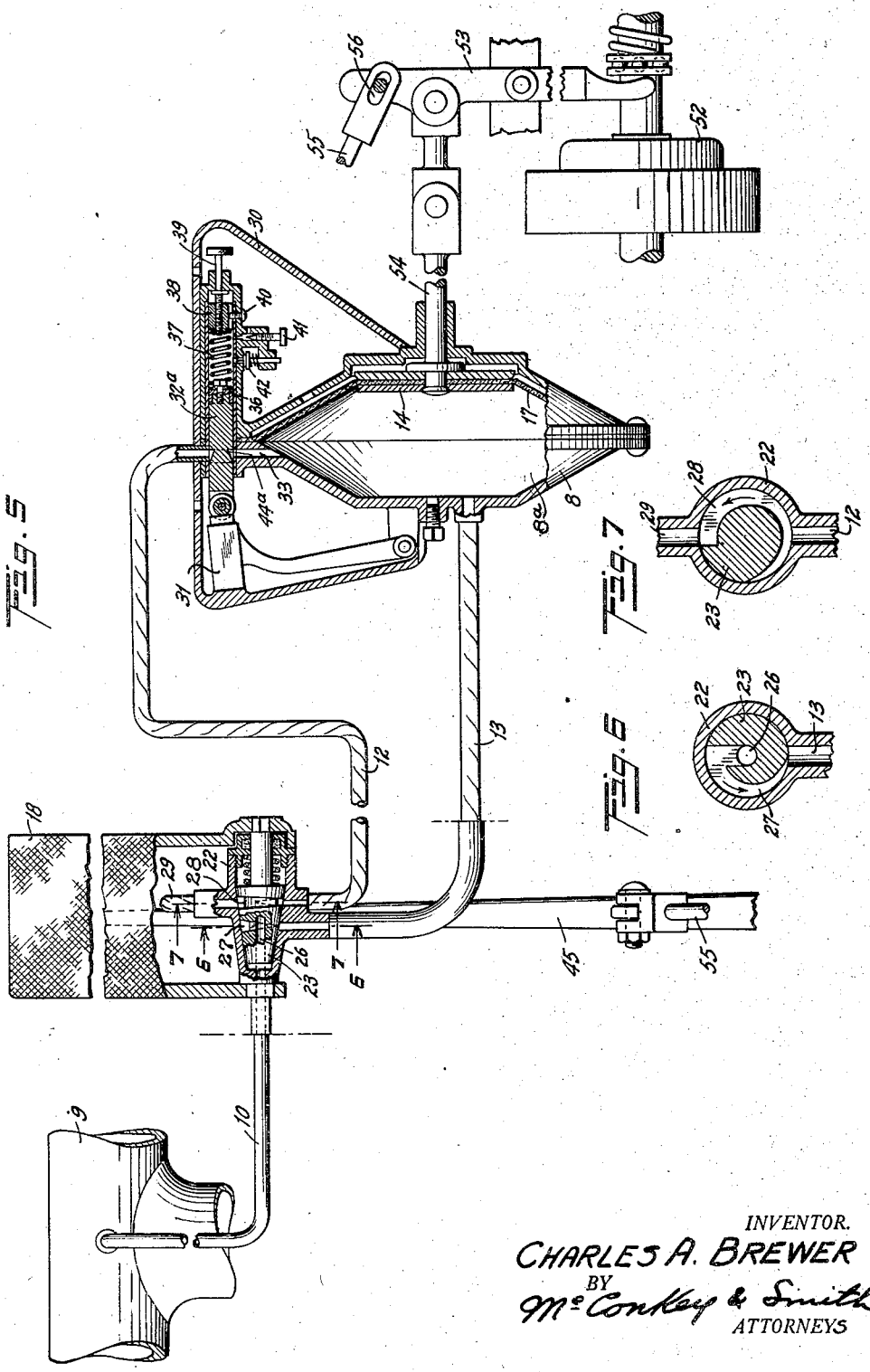
INVENTOR.
CHARLES A. BREWER
BY McConkey & Smith
ATTORNEYS Patented Apr. 14, 1942

2,279,732

UNITED STATES PATENT OFFICE 2,279,732

POWER DEVICE

Charles A. Brewer, Noroton Heights, Conn., assignor of one-half to Philip J. Kury, Arverne, N. Y.

Application August 7, 1934, Serial No. 738,826

7 Claims. (Cl. 192—91)

This invention relates to fluid pressure operated devices, and more particularly to power means of the vacuum type.

It has heretofore been proposed to provide vacuum operated power devices so mounted as to relieve the driver of an automotive vehicle of much of the effort in applying the brakes, and in actuating the clutch. While these devices for the most part have proven satisfactory, they have been so constructed that a careless driver may employ them to operate the brakes, or the clutch, in such a manner as to cause annoyance to the passengers by too sudden changes in the deceleration or acceleration of the vehicle.

One of the objects of the present invention is to provide a power device of the fluid pressure type for use with brakes or clutches, embodying novel means for preventing excessively sudden changes in the deceleration or acceleration of a vehicle.

Another object of the invention is to provide a fluid pressure operated power unit embodying novel inertia means for controlling the operation of said unit.

A further object is to provide a power device, of the above type, which embodies novel control means so constructed that after operation of the control member, the power unit and the elements actuated thereby are prevented from imparting excessively abrupt changes in the deceleration or acceleration to the vehicle.

The above and other objects and advantages of the invention will appear more fully hereinafter, in the detailed description which is to be read in connection with the accompanying drawings wherein like reference characters refer to like parts throughout the several views. It is to be expressly understood, however, that the drawings are for the purpose of illustration only, and are not designed as a definition of the limits of the invention, reference being primarily had for this purpose to the appended claims. In the drawings, Fig. 1 is a diagrammatic side elevation of the power unit of the present invention, operatively associated with a vehicle brake;

Fig. 2 is a view, on an enlarged scale, which is partly in section and partly diagrammatic, illustrating the control unit and the valve mechanism shown in Fig. 1;

Fig. 3 is a side elevation of one form of means which may be employed for controlling the power unit;

Fig. 4 is a diagrammatic view, partly in section and partly in elevation, illustrating a second embodiment of the invention;

Fig. 5 is a diagrammatic view, partly in section and partly in elevation, illustrating the power unit of the present invention operatively associated with a vehicle clutch; and Figs. 6 and 7 are detail sections taken on the lines 6—6 and 7—7 respectively of Fig. 5.

The novel power unit disclosed herein is adapted for manual control, but if the operator is careless and actuates the unit in such a manner as to abruptly change the acceleration or deceleration of the vehicle, his control is interrupted and the power unit is automatically actuated in the desired manner.

Referring to the embodiment of the invention shown in Figs. 1 and 2, a casing 8 is operatively connected to the intake manifold 9 of an internal combustion engine by means of a pipe 10, valve 11 and pipe 13 and to atmosphere by means of valve 11 and pipe 12. The element 14 of the power unit is operatively connected to a brake rod 15 adapted to control a brake 16.

In the form shown, the element 14 is provided with a diaphragm 17 secured to element 14 and casing 8 in such a manner as to provide an airtight chamber 8a. It will be understood, however, that the casing 8 may be a cylinder of the usual type in which is slidably mounted the common form of piston, or, if desired, an expansible and collapsible, corrugated packing member may be operatively connected to element 14 and casing 8 to prevent leakage.

Suitable means are provided for controlling the air and vacuum connections 12 and 13 to casing 8. In the form shown, such means are constituted by a pedal 18 pivotally mounted on the floor boards 19 of the vehicle, and normally held in the full-line position by means of a spring 20 operatively secured to said pedal and to a Z-shaped bracket 21. A valve casing 22, supported on bracket 21, carries therein a rotatably mounted and tapered valve 23 having the longitudinal axis thereof coincident with the pivotal axis of the foot pedal 18. As shown, the right end of valve 23 is of reduced cross-section and is squared, as at 24, for engagement by, and rotation with, pedal 18. A coil spring 25 is preferably interposed between said valve and a shoulder formed in any suitable manner within casing 22 to insure that the conical valve 23 will at all times remain in close engagement with the inner surface of the casing, despite wear of the parts.

A longitudinal passage 26 is provided in the left-hand portion of valve 23, which passage communicates with a passage in the valve housing that is operatively associated with the intake manifold 9 through pipe 10. A tapered passage 27 communicates with longitudinal passage 26, the former being provided in the periphery of valve 23 and in a position such that upon rotation of the valve said tapered passage will register with the pipe 13 leading from casing 22 to casing 8.

The larger end of valve 23 is provided with a peripheral tapered passage 28 that registers with the atmosphere pipe 12 leading from casing 22 to casing 8. Tapered passage 28 also communicates with an atmosphere inlet 29 operatively associated with valve casing 22.

Novel means are associated with the power unit for controlling the application of power to rod 15 and brake 16, said means being of the inertia type whereby an excessively sudden deceleration of the vehicle is automatically prevented. As illustrated, a triangularly shaped casing 30 is secured to or formed integrally with casing 8, and within casing 30 is pivotally mounted an inertia member 31 having operative engagement with a piston 32 adapted to control an air passage 33 formed in the wall of casing 8.

Piston 32 is reciprocably mounted within a cylinder 34 which may be formed, if desired, integrally with the casing 8. Sleeve 35 is preferably inserted in cylinder 34 to provide a smooth surface for the movement of piston 32, the latter carrying a suitable packing 36 to prevent leakage. Normally, a spring 37, mounted within the cylinder and engaging one end of the piston, maintains said piston and inertia member 31 in the normal position illustrated. The tension of spring 37 may be adjusted by means of a block 38 and its associated screw 39, which projects exteriorly of cylinder 34. A set screw 40 is mounted to extend through the wall of the cylinder and through sleeve 35 into a groove in the lower face of block 38 to insure that rotation of member 39 will produce longitudinal movement of block 38.

An adjustable bleed valve 41 is provided to control the flow of air to and from cylinder 34, and in addition a spring pressed check valve 42 controls an air passage in the cylinder walls whereby air is permitted to escape relatively freely from the cylinder upon movement of the piston to the left under the action of inertia member 31. If desired, a roller 43 may be pivoted to the outer end of piston 32 for engagement with the adjacent end of the inertia member to facilitate transfer of energy from the pivotally mounted member 31 to the rectilineally movable member 32. The latter is also provided with a tapered air passage 44 in the lower face thereof, which passage is adapted to register, under certain conditions, with the air passage 33.

In operation, pedal 18 is depressed against the tension of spring 20, the resistance offered by the latter being greater as the angular movement of the pedal increases, whereby operation of the usual brake pedal is simulated to a certain extent. This pivotal movement of pedal 18 is effective through the splined or squared portion 24 of valve 23 to rotate the latter, reducing the area of the air passage 38 and opening the vacuum passage 10, 26, 27 and 13 to casing 8. Air is now exhausted from said casing, and if the pedal and valve are moved through a predetermined angular distance, the air passage is so reduced that the vacuum formed in casing 8 is effective to move diaphragm 14, 17 to the left together with rod 15 to apply brake 16. If the operator is careless in his manipulation of pedal 18 and moves the latter a distance such that there is a tendency for the brakes to lock, the sudden deceleration thus given the vehicle results in a sudden slowing down of the casing 8, cylinder 34 and piston 32. The pivoted inertia member 31, however, moves anticlockwise about its pivot, and this relative movement is effective to move piston 32 to the left within cylinder 34, compressing spring 37 and bringing passage 44 into register with the air passage 33, whereby air is introduced into casing 8 and the vacuum therein is partially destroyed. The power effective to move diaphragm 14, 17 and rod 15 to brake applying position is thus reduced to such an extent that the brakes are automatically and partially released, whereby abrupt deceleration is prevented. Movement of piston 32 to the left is resisted solely by spring 37, since valve 42 permits free escape of air through its associated passage.

As the braking effort is partly relieved, spring 37 becomes effective to return piston 32 and inertia member 31 to the normal position shown in Fig. 2. As piston 32 moves to the right, valve 42 is seated by a suitable spring and the only air that can enter the piston must flow past the adjustable bleed valve 41. Accordingly, the rate at which piston 32 returns to normal position and the air bleed passage 33, 44 is closed, depends primarily on the adjustment of bleed valve 41. The adjustment of the latter thus determines the speed with which the vacuum is re-established within casing 8, it being noted that it is not essential for the driver to change the pressure which he applies to pedal 18, since piston 32 and its associated elements, by closing off air passage 33, 44, render it possible for the engine suction to automatically effect a re-establishment of the vacuum within the cylinder, and hence the power for applying the brakes. The latter will consequently be reapplied gradually and uniformly in the desired manner to prevent jerking or skidding of the vehicle.

Tapered passages 27 and 28 are so disposed and formed that valve 23 may be rotated to a position such that the vacuum in casing 8 is effective to counter-balance the tension of the brake spring and hold the brake and element 14 in a predetermined position.

In Fig. 3, there is disclosed a manually operable brake pedal 45 which carries the pedal 18 and associated valve 22, 23 whereby manual operation of the brake may be effected in the event of failure of the power cylinder.

The embodiment of the invention illustrated in Fig. 4 comprises a single conduit 46 leading from the intake manifold (not shown) to a casing 47 having a diaphragm 48 operatively connected to the brake rod 49. Casing 30 and the elements therein, previously described in connection with Fig. 2 above, are also associated with said casing 47. A portion of the latter, as for example the member 50, is pivotally secured to a manually operable brake pedal 51. In operation, vacuum is at all times effective to maintain diaphragm 48 in the position indicated closely adjacent plate 50 of casing 47. If it is desired to apply the brakes, the driver exerts pressure on the pedal 51, moving it in an anti-clockwise direction, the casing 47 being supported by the brake linkage and movable therewith to the left with the brake pedal. The vacuum controlled diaphragm within casing 47, 50 constitutes a yielding means in the brake linkage. In the event that the driver moves pedal 51 to a position such as to too suddenly decelerate the car, the inertia member is effective to open the air bleed in the manner described above in connection with Fig. 2, whereupon the vacuum in casing 47, 50 is partially destroyed, diaphragm 48 and rod 49 moving to the right relative to casing 47, 50 to automatically release the brakes. As soon as the piston, associated with the inertia member, returns to normal position, the vacuum is again effective to apply the brakes without further movement of pedal 51. The power unit thus effectively controls the manual effort that can be applied to the brakes.

In Fig. 5, the power unit and valve control therefor are quite similar to that shown in Fig. 2, but the power unit is shown associated with a clutch 52 that is operatively connected through a lever 53 and rod 54 with the element 14. A link 55, having a lost motion connection, at 56, with lever 53 and pivotally connected at its opposite end to pedal 45 carrying valve 22, 23, provides means for manually operating the clutch in the event of failure of the power unit. Since the inertia member 31 and its associated piston 32a must control and prevent abrupt acceleration of the vehicle, the relative positions of these two members are reversed with respect to the showing of Fig. 2.

A tapered, annular groove 44a, formed in piston 32a, normally registers with air passage 33 and also with the air pipe 12, which communicates with tapered passage 28 in valve 23. Casing 8 is thus normally open to atmospheric pressure. In the form shown, the tapered suction passage 27 in the valve is so formed (Fig. 6) that when pedal 18 is in released position the casing 8 is in communication with intake manifold 9, but the communicating passage is quite restricted.

When pedal 18 is depressed and valve 23 is rotated, the suction passage is opened and the air passage to casing 8 is restricted, whereby a partial vacuum is created in the casing, diaphragm 14, 17 is moved to the left, and the friction surfaces of the clutch are disengaged. When it is desired to reengage the clutch surfaces, pedal 18 is permitted to move, under the action of its spring (Fig. 3) toward normal position. If the operator is careless and allows pedal 18 to move so rapidly as to cause an abrupt engagement of the clutch surfaces, an abrupt acceleration will be imparted to the vehicle, whereupon inertia member 31 moves piston 32a to the right and air passage 33, 44a, 12 is closed. The suction effective in the casing 8 is thus relatively increased, the partial vacuum created tends to disengage the clutch surfaces, and excessive acceleration of the vehicle is prevented. Spring 37 and its associated elements are effective to slowly return piston 32a to normal position, reopening air passage 33, 44a, and the clutch is automatically engaged in the desired manner.

There is thus provided a novel vacuum power unit, adapted for use with brakes or clutches, which is so constructed as to automatically prevent annoyance or damage resulting from careless operation. The mechanism is so constructed as to provide for power operation only, for combined manual and power operation so that the power unit will function as an "assistor," or for manual operation in the event of failure of the power means. The "assistor" operation may be obtained by varying the relative size and position of the tapered passages in valve 23.

As will be apparent to those skilled in the art, the inertia member may be secured directly to the inertia controlled piston, rather than pivoted in the casing 30, if desired. The unit shown in Figs. 1, 2 or 5 may be mounted at a convenient point on the vehicle by means of a suitable yoke 57 (Fig. 1) and trunnions 58, when pivotal movement of the unit is desired. Air connection 29 is preferably led to a point on the vehicle such that there is little likelihood of foreign matter being introduced into the power unit. Various changes, other than those indicated, may be made in the details of construction and arrangement of parts, and accordingly reference will be had to the appended claims for a definition of the limits of the invention.

What is claimed is:

1. In apparatus of the class described, a fluid pressure chamber, a pressure responsive element therein, a vacuum connection for said chamber, said chamber being provided with an air passage, a piston having a groove therein for controlling said air passage, said groove normally being in register with the passage, and adjustable yielding means for normally maintaining the piston in a predetermined position.

2. In combination with the clutch of a motor vehicle, a vacuum operated power unit operatively connected to said clutch to disengage and engage the latter, a vacuum connection between the power unit and the intake manifold of the motor of said vehicle, valve means for controlling said vacuum connection, a manually operable member for actuating said valve means, and inertia control means for regulating operation of the power unit to control engagement of the clutch.

3. In combination with the clutch of a motor vehicle, a vacuum operated power unit operatively connected to said clutch to disengage and engage the latter, a vacuum connection between the power unit and the intake manifold of the motor of the vehicle, manually operable valve means for controlling said vacuum connection to partially or wholly disengage or engage said clutch, inertia control means for regulating operation of the power unit to control engagement of the clutch, and means for controlling the operation of the inertia control means.

4. In apparatus of the class described, a fluid pressure motor comprising a fluid pressure chamber and a pressure responsive element, a fluid connection for said chamber, an atmospheric connection for said chamber, and control means for said last-named connection comprising a cylinder and a piston, the latter having a reduced portion, resilient means for normally holding said piston with the reduced portion thereof in register with said atmospheric connection to open the same, and inertia means for moving said piston to close said atmospheric connection.

5. In apparatus of the class described, a fluid pressure motor having a vacuum connection and an air connection, a piston for controlling the passage of air through said air connection, said piston being movable in one direction to open said air connection and in the other direction to close said air connection, inertia means for moving said piston in one of said directions, and resilient means for moving said piston in the other of said directions.

6. In apparatus of the class described, a fluid pressure power unit having an atmospheric connection, a piston valve for controlling the flow of air through said connection, inertia means for moving said piston valve in one direction to open said connection, and yielding means for moving said piston valve in the opposite direction to close said connection.

7. In apparatus of the class described, the combination with a vacuum operated power unit, having a normally open air connection, of means for controlling the flow of air through said connection including a cylinder and a piston, inertia means adapted to move said piston to close said connection to vary the fluid pressure in said power unit, and yielding means for returning the piston to normal position.

CHARLES A. BREWER.